US012399519B2

(12) United States Patent
Zhang

(10) Patent No.: US 12,399,519 B2
(45) Date of Patent: Aug. 26, 2025

(54) LOW DROPOUT LINEAR REGULATOR AND CONTROL CIRCUIT THEREOF

(71) Applicant: SG MICRO CORP, Beijing (CN)

(72) Inventor: Lidi Zhang, Beijing (CN)

(73) Assignee: SG MICRO CORP, Beijing (CN)

( * ) Notice: Subject to any disclaimer, the term of this patent is extended or adjusted under 35 U.S.C. 154(b) by 623 days.

(21) Appl. No.: 17/790,253

(22) PCT Filed: Sep. 4, 2020

(86) PCT No.: PCT/CN2020/113557

§ 371 (c)(1),
(2) Date: Jan. 3, 2023

(87) PCT Pub. No.: WO2021/135349

PCT Pub. Date: Jul. 8, 2021

(65) Prior Publication Data

US 2023/0122458 A1 Apr. 20, 2023

(30) Foreign Application Priority Data

Dec. 31, 2019 (CN) ......................... 201911422084.7

(51) Int. Cl.
*G05F 1/575* (2006.01)
*G05F 1/46* (2006.01)
(Continued)

(52) U.S. Cl.
CPC .............. *G05F 1/575* (2013.01); *G05F 1/461* (2013.01); *G05F 1/563* (2013.01); *G05F 3/262* (2013.01)

(58) Field of Classification Search
CPC .......... G05F 1/575; G05F 1/461; G05F 1/563; G05F 3/262
See application file for complete search history.

(56) References Cited

U.S. PATENT DOCUMENTS 7,061,302 B2 6/2006 Kondo et al.
7,106,126 B2 9/2006 Kondo et al.
(Continued)

FOREIGN PATENT DOCUMENTS

CN 1536666 A 10/2004
CN 101567628 A 10/2009
(Continued)

OTHER PUBLICATIONS

International Search Report and Written Opinion for International Application No. PCT/CN2020/113557, dated Nov. 9, 2020, 13 pages.

*Primary Examiner* — Adolf D Berhane
(74) *Attorney, Agent, or Firm* — Westman, Champlin & Koehler, P.A.

(57) ABSTRACT

Disclosed is a low dropout linear voltage regulator and a control circuit thereof. The control circuit includes an error amplifier and a backflow prevention circuit, which compares an input voltage with an output voltage, to switch a substrate voltage and a voltage at a control terminal of the power transistor to a higher one of the input voltage and the output voltage, thus the power transistor and its parasitic diode can be turned off in time when the output voltage is greater than the input voltage, so as to prevent the power transistor from being damaged by current backflow and improve reliability of the low dropout linear regulator.

18 Claims, 3 Drawing Sheets

200

(51) Int. Cl.
*G05F 1/563* (2006.01)
*G05F 3/26* (2006.01)

(56) References Cited

U.S. PATENT DOCUMENTS

| | | | | |
|---|---|---|---|---|
| 8,004,257 | B2 | 8/2011 | Imura et al. | |
| 8,664,925 | B2 * | 3/2014 | Sudou | G05F 1/56 327/59 |
| 11,971,734 | B2 * | 4/2024 | Zhang | G05F 3/262 |
| 2004/0196096 | A1 | 10/2004 | Kondo et al. | |
| 2006/0028267 | A1 | 2/2006 | Kondo et al. | |
| 2009/0206807 | A1 | 8/2009 | Imura et al. | |
| 2011/0169465 | A1 | 7/2011 | Sudou et al. | |
| 2023/0409065 | A1 * | 12/2023 | Feng | G05F 1/468 |
| 2024/0152168 | A1 * | 5/2024 | Uchimoto | G05F 1/575 |
| 2024/0272665 | A1 * | 8/2024 | Feng | G05F 1/575 |

FOREIGN PATENT DOCUMENTS

| | | | |
|---|---|---|---|
| CN | 102033560 | A | 4/2011 |
| CN | 102880217 | A | 1/2013 |
| CN | 108776502 | A | 11/2018 |
| CN | 209327890 | U | 8/2019 |

* cited by examiner

220

LOW DROPOUT LINEAR REGULATOR AND CONTROL CIRCUIT THEREOF

CROSS-REFERENCES TO RELATED APPLICATIONS

The present application is a Section 371 National Stage application of International Application No. PCT/CN2020/113557, filed on Sep. 4, 2020 and published as WO/2021/135349 A1, on Jul. 8, 2021, not in English, which claims priority to Chinese patent application No. 201911422084.7, filed on Dec. 31, 2019, entitled "LOW DROPOUT LINEAR REGULATOR AND CONTROL CIRCUIT THEREOF", the entire contents of which are incorporated in this application by reference in their entireties.

FIELD OF THE DISCLOSURE

The present disclosure relates to a technical field of linear regulators, in particular to a low dropout linear regulator with low power consumption and a control circuit of a low dropout linear regulator.

DESCRIPTION OF THE RELATED ART

A low dropout linear regulator (LDO) is used to convert an unstable input voltage into an adjustable DC (direct current) output voltage, which can be used as power supply for other systems. The linear voltage regulator has simple structure, low static power consumption and low output voltage ripple, thus, it is often used for on-chip power management in chips of mobile consumer electronic devices.

FIG. 1 shows a schematic circuit diagram of a conventional low dropout linear regulator. As shown in FIG. 1, the low dropout linear regulator 100 comprises a power transistor Mpout, an error amplifier 110, a resistor R1 and a resistor R2. The power transistor Mpout is configured to supply an output voltage Vout to a post-stage load according to an input voltage Vin. The resistor R1 and the resistor R2 are connected in series between an output terminal of the power transistor Mpout and ground, and an intermediate node between the resistor R1 and the resistor R2 is configured to provide a feedback voltage VFB of the output voltage Vout. The error amplifier 110 is configured to compare the feedback voltage VFB with a reference voltage VREF to obtain an error signal between the feedback voltage VFB and the reference voltage VREF, and adjust a voltage potential at a gate electrode of the power transistor Mpout according to the error signal between the feedback voltage VFB and the reference voltage VREF, so as to adjust the feedback voltage VFB to be equal to the reference voltage VREF, thereby stabilizing the output voltage Vout.

Connections of a source electrode and a substrate of the power transistor Mpout of the conventional LDO with the input voltage Vin are shown in FIG. 1. A cathode of a parasitic diode D1 between the substrate and a drain electrode of the power transistor Mpout is connected with the input voltage Vin, and an anode of the parasitic diode D1 is connected with the output voltage Vout. Because the conventional LDO is mostly used for voltage reduction, the input voltage Vin is generally greater than the output voltage Vout, and the parasitic diode D1 of the power transistor Mpout is turned off under reverse voltage condition, which will not affect normal operations of the LDO. But with rapid development of integrated circuits and wide application of LDO, sometimes, there are multiple power supplies at load end, which may make the output voltage Vout higher than the input voltage Vin, or the input voltage Vin may be short-circuited to ground or floated in real applications, the parasitic diode D1 in the power transistor Mpout will be turned on under forward voltage condition, which will not only consume current in the circuit, but even may cause permanent damage to the power transistor Mpout. Therefore, it is necessary to solve a backflow prevention problem of the conventional LDO.

SUMMARY OF THE DISCLOSURE

In view of the above problems, an objective of the present disclosure is to provide a low dropout linear regulator and a control circuit thereof. When an output voltage is greater than an input voltage, a power transistor and its parasitic diode can be turned off in time, so as to prevent the power transistor from being damaged by current backflow and improve reliability of the low dropout linear regulator.

According to an aspect of an embodiment of the present disclosure, provided is a control circuit of a low dropout linear voltage regulator, wherein the low dropout linear voltage regulator comprises a power transistor connected between a power supply terminal and an output terminal, the control circuit is configured to drive the power transistor to convert an input voltage into an output voltage, and the control circuit comprises: an error amplifier, configured to drive the power transistor according to a voltage difference between a feedback voltage of the output voltage and a reference voltage; and a backflow prevention circuit, configured to compare the input voltage and the output voltage, so as to switch a substrate voltage and a voltage at a control terminal of the power transistor to a higher one of the input voltage and the output voltage.

In some embodiments, the backflow prevention circuit is further configured to turn off a signal path from an output terminal of the error amplifier to the control terminal of the power transistor when the output voltage is greater than the input voltage.

In some embodiments, the control circuit further comprises a switch circuit connected between the output terminal of the error amplifier and the control terminal of the power transistor, wherein the backflow prevention circuit is further configured to control the switch circuit to operate in an on/off state according to a comparison result between the input voltage and the output voltage.

In some embodiments, the switch circuit comprises a first switch transistor and a second switch transistor connected in parallel between the output terminal of the error amplifier and the control terminal of the power transistor, wherein a control terminal of the first switch transistor is configured to receive a first switching control signal and a control terminal of the second switch transistor is configured to receive a second switching control signal.

In some embodiments, the first switch transistor is a P-type MOSFET and the second switch transistor is an N-type MOSFET.

In some embodiments, the backflow prevention circuit comprises: a comparison module, configured to compare the input voltage and the output voltage to obtain a comparison signal; a logic module, configured to generate the first switching control signal and the second switching control signal according to the comparison signal; an output module, configured to switch the substrate voltage of the power transistor to the input voltage or the output voltage according to the first switching control signal and the second switching control signal, and switch the voltage at the control terminal of the power transistor to the output voltage according to the second switching control signal.

In some embodiments, the backflow prevention circuit further comprises a power supply module, configured to supply power to the comparison module when a voltage difference between the output voltage and the input voltage is less than a turn-on transistor threshold voltage.

In some embodiments, the power supply module comprises: a first transistor, having a first current terminal connected with the substrate voltage, a second current terminal for receiving the input voltage, and a control terminal; a second transistor, having a first current terminal connected to the substrate voltage, a second current terminal for receiving the output voltage, and a control terminal, wherein the control terminal of the first transistor is connected to the second current terminal of the second transistor, and the control terminal of the second transistor is connected to the second current terminal of the first transistor.

In some embodiments, the comparison module comprises: a third transistor and a ninth transistor sequentially connected in series between the substrate voltage and ground; a fourth transistor, a seventh transistor and a current source sequentially connected in series between the substrate voltage and ground; a fifth transistor and an eighth transistor sequentially connected in series between the substrate voltage and a first terminal of the current source; a sixth transistor and a tenth transistor sequentially connected in series between the substrate voltage and ground, wherein the third transistor and the fourth transistor form a current mirror, the fifth transistor and the sixth transistor form a current mirror, the ninth transistor and the tenth transistor form a current mirror, a control terminal of the seventh transistor is used for receiving the output voltage, a control terminal of the eighth transistor is used for receiving the input voltage, and an intermediate node between the sixth transistor and the tenth transistor is used for providing the comparison signal.

In some embodiments, the logic module comprises a first inverter, a second inverter and a third inverter sequentially connected in series, wherein an input terminal of the first inverter is used for receiving the comparison signal, an output terminal of the second inverter is used for providing the second switching control signal, and an output terminal of the third inverter is used for providing the first switching control signal.

In some embodiments, the output module comprises: an eleventh transistor, having a first current terminal connected with the substrate voltage, a second current terminal for receiving the input voltage, and a control terminal for receiving the first switching control signal; a twelfth transistor, having a first current terminal connected to the substrate voltage, a second current terminal for receiving the output voltage, and a control terminal for receiving the second switching control signal; and a thirteenth transistor, having a first current terminal connected to the substrate voltage, a second current terminal connected to the control terminal of the power transistor, and a control terminal for receiving the second switching control signal.

In some embodiments, the control circuit further comprises a first resistor and a second resistor connected in series between the output terminal and ground, wherein an intermediate node between the first resistor and the second resistor is used to provide the feedback voltage.

In some embodiments, the control circuit also comprises a clamp circuit connected between ground and the intermediate node between the first resistor and the second resistor, and the clamp circuit is used for clamping the feedback voltage at a safe voltage.

In some embodiments, the clamp circuit comprises fourteenth to sixteenth transistors which are sequentially connected in series between the intermediate node between the first resistor and the second resistor and ground, and are each connected into a diode structure.

In some embodiments, the first transistor and the second transistor are P-type MOSFETs.

In some embodiments, the third transistor, the fourth transistor, the fifth transistor and the sixth transistor are P-type MOSFETs, and the seventh transistor, the eighth transistor, the ninth transistor and the tenth transistor are N-type MOSFETs.

In some embodiments, the eleventh transistor, the twelfth transistor and the thirteenth transistor are P-type MOSFETs.

In some embodiments, the fourteenth transistor, the fifteenth transistor and the sixteenth transistor are N-type MOSFETs.

According to another aspect of an embodiment of the present disclosure, a low dropout linear voltage regulator is provided, and comprises: a power transistor, connected in series between a power supply terminal and an output terminal; and the control circuit according to embodiments of the present disclosure, configured to drive the power transistor.

In the low dropout linear regulator and the control circuit thereof according to embodiments of the present disclosure, the control circuit comprises a backflow prevention circuit, which is configured to compare the input voltage with the output voltage, so as to switch the substrate voltage and the voltage at the control terminal of the power transistor to a higher one of the input voltage and the output voltage, therefore, the power transistor and its parasitic diode can be turned off in time when the output voltage is greater than the input voltage, so as to prevent the power transistor from being damaged by backflow current and improve reliability of the low dropout linear regulator.

In a further embodiment, the control circuit further comprises a switch circuit connected between the output terminal of the error amplifier and the control terminal of the power transistor, the backflow prevention circuit is configured to turn off the signal path from the output terminal of the error amplifier to the control terminal of the power transistor through the switch circuit when the output voltage is greater than the input voltage, therefore, when the output voltage is greater than the input voltage, a current backflow path from the control terminal of the power transistor to the error amplifier is avoided to be formed, thus preventing the error amplifier from being damaged.

BRIEF DESCRIPTION OF THE DRAWINGS

The above and other objectives, advantages and features of the present disclosure will become more fully understood from the detailed description given hereinbelow in connection with the appended drawings, and wherein.

DETAILED DESCRIPTION OF EMBODIMENTS OF THE DISCLOSURE

Figure 1:
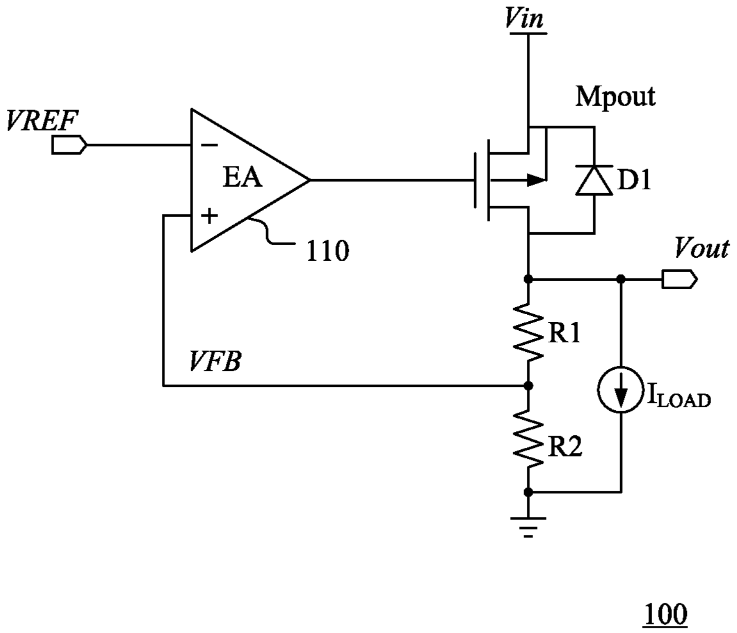
FIG. 1 shows a circuit schematic diagram of a conventional low dropout linear regulator.

Various embodiments of the present disclosure will be described in more detail below with reference to the accompanying drawings. In various drawings, the same elements are denoted by the same or similar drawing symbols. For the sake of clarity, various parts in the drawings are not drawn to scale.

It should be understood that, in the following description, "circuit" refers to a conductive circuit formed by at least one element or sub-circuit through electrical or electromagnetic connection. When an element or circuit is referred to as being "connected to"/"coupled to" another element or an element/circuit is "connected"/"coupled" between two nodes, it can be directly coupled or connected to another element or an intermediate element may be present, and the elements may be connected physically, logically, or both. Instead, when an element is referred to as being "directly coupled to" or "directly connected to" another element, it is meant that there is no intermediate element present between the elements.

In the present disclosure, a power transistor is a transistor operating in a linear mode to provide a current path, and can be implemented as a bipolar transistor or a field effect transistor. A first current terminal and a second current terminal of the power transistor respectively serve as a high potential terminal and a low potential terminal on the current path, and a control terminal of the power transistor is used to receive a driving signal, which is used for controlling a voltage drop of the power transistor. The power transistor can be a P-type MOSFET (Metal-Oxide-Semiconductor Field-Effect Transistor) or an N-type MOSFET. The first current terminal, the second current terminal and the control terminal of the P-type MOSFET are a source electrode, a drain electrode and a gate electrode, respectively, and the first current terminal, the second current terminal and the control terminal of the N-type MOSFET are a drain electrode, a source electrode and a gate electrode, respectively.

The present disclosure is further explained below with reference to the accompanying drawings and embodiments.

Figure 2:
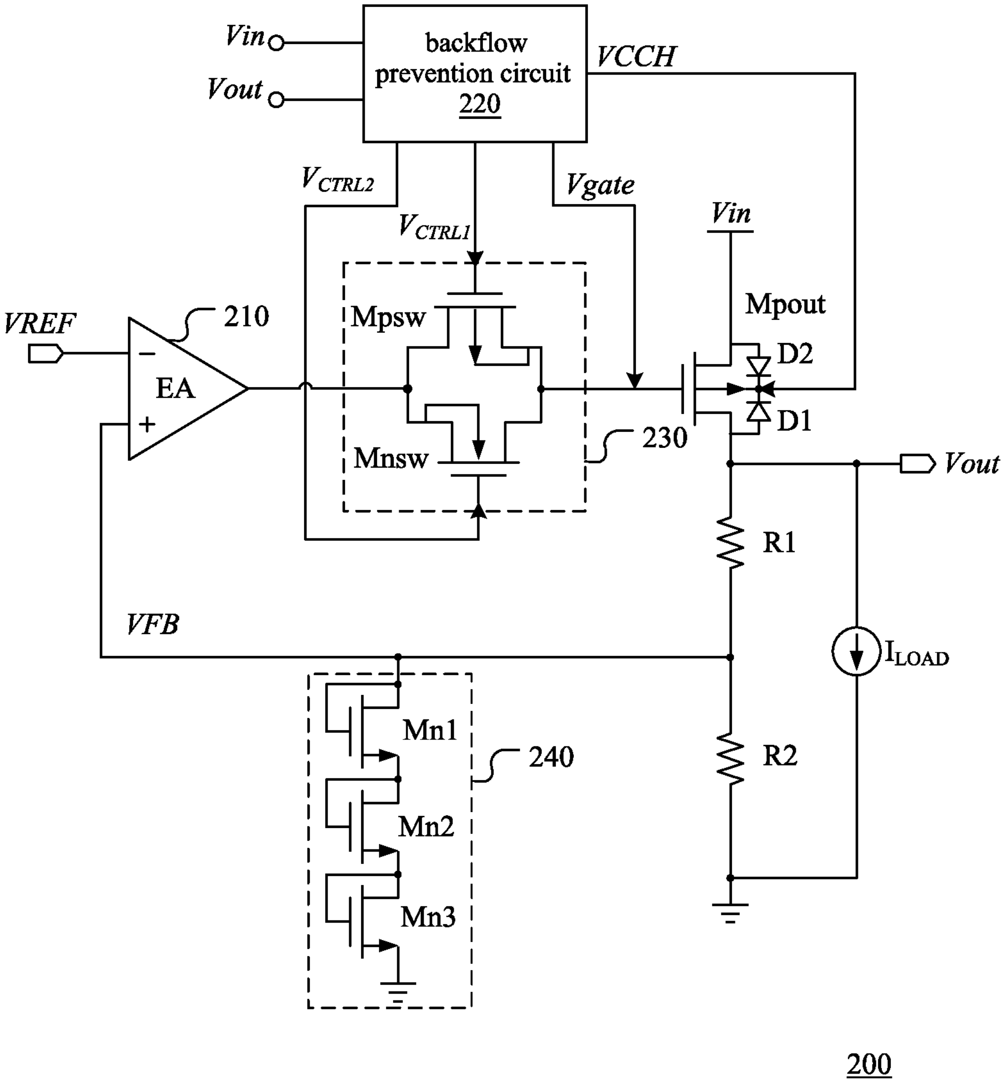
FIG. 2 shows a circuit schematic diagram of a low dropout linear regulator according to an embodiment of the present disclosure.

FIG. 2 shows a circuit schematic diagram of a low dropout linear regulator according to an embodiment of the present disclosure. As shown in FIG. 2, the low dropout linear regulator 200 includes a power transistor Mpout and a control circuit, which are integrated in a same integrated circuit chip. The power transistor Mpout is a main output transistor of the chip. The power transistor Mpout is implemented by, for example, a P-type MOSFET, and has a first current terminal for receiving an input voltage Vin, and a second current terminal for providing an output voltage Vout to a post-stage load.

In some other embodiments, the power transistor Mpout may also be implemented by a transistor selected from a group consisting of an NPN Darlington transistor, an NPN-type bipolar transistor, a PNP-type bipolar transistor, or an N-type MOSFET, etc.

The control circuit is used to drive the power transistor Mpout, so that the power transistor Mpout can provide an output current to the post-stage load.

Specifically, the control circuit may include an error amplifier 210 and a backflow prevention circuit 220. The error amplifier 210 is configured to control an on-resistance between the first current terminal and the second current terminal of the power transistor Mpout by controlling a voltage at the control terminal of the power transistor Mpout, thereby controlling source-drain voltage drop of the power transistor Mpout.

Further, the error amplifier 210 is configured to compare a feedback voltage VFB with a reference voltage VREF, and when there is a deviation between the feedback voltage VFB and the reference voltage VREF, the error amplifier 210 is configured to amplify the deviation and control the source-drain voltage drop of the power transistor Mpout based on the amplified deviation. In this embodiment, when the output voltage Vout decreases, a voltage difference between the feedback voltage VFB and the reference voltage VREF increases, thus increasing the voltage applied to the control terminal of the power transistor Mpout, reducing the on-resistance between the first current terminal and the second current terminal of the power transistor Mpout, and reducing the voltage drop across the power transistor Mpout, so that a voltage at the output terminal of the low dropout linear regulator 200 can be increased, and the output voltage Vout can be restored to a normal voltage level.

In some other embodiments of the present disclosure, the control circuit also includes a feedback network connected between the output terminal and ground, and the error amplifier 210 is configured to control the source-drain voltage drop of the power transistor Mpout according to the voltage difference between the reference voltage and the feedback voltage provided by the feedback network. As an example, the control circuit of the low dropout linear regulator 200 includes a resistor R1 and a resistor R2 connected in series between an output terminal of the power transistor Mpout and ground, and an intermediate node between the resistor R1 and the resistor R2 serves to provide the feedback voltage VFB of the output voltage Vout.

The backflow prevention circuit 220 is configured to compare the input voltage Vin and the output voltage Vout to obtain a comparison result, and switch a substrate voltage VCCH and a voltage Vgate at the control terminal of the power transistor Mpout to a higher one of the input voltage Vin and the output voltage Vout according to the comparison result. For example, when the input voltage Vin is greater than the output voltage Vout, the substrate voltage VCCH of the power transistor Mpout is equal to the input voltage Vin, and the voltage Vgate at the control terminal of the power transistor Mpout is controlled by the error amplifier 210. Under this situation, neither parasitic diodes D1 and D2 in the power transistor Mpout will be turned on under forward voltage condition, and the power transistor Mpout has no substrate bias effect, so normal operations of the power transistor Mpout will not be affected. As another example, when the output voltage Vout is greater than the input voltage Vin, the substrate voltage VCCH and the voltage Vgate at the control terminal of the power transistor Mpout are both equal to the output voltage Vout, and neither the parasitic diodes D1 and D2 in the power transistor Mpout are turned on under forward voltage condition. In addition, gate-source voltage Vgs of the power transistor Mpout is greater than 0, and gate-drain voltage Vgd of the power transistor is equal to 0, so the power transistor Mpout is turned off, and no current backflow path will be formed from the output voltage Vout to the input voltage Vin in the circuit, thus effectively protecting the power transistor Mpout.

Further, a maximum voltage of an internal circuit in the error amplifier 210 is equal to the input voltage Vin, thus, when the output voltage Vout is greater than the input voltage Vin, there is a voltage difference between the voltage Vgate at the control terminal of the power transistor Mpout and a voltage of the internal circuit of the error amplifier 210, based on which a current backflow path from the control terminal of the power transistor Mpout to the error amplifier 210 may be formed. In order to avoid forming a current backflow path from the control terminal of the power transistor Mpout to the error amplifier 210, when the output voltage Vout is greater than the input voltage Vin, the control circuit according to the present embodiment further includes a switch circuit 230 connected between the output terminal of the error amplifier 210 and the control terminal of the power transistor Mpout. The backflow prevention circuit 220 is also used to control the switch circuit 230 to turn off a signal path from the output terminal of the error amplifier 210 to the control terminal of the power transistor Mpout when the output voltage Vout is greater than the input voltage Vin.

Further, the switch circuit 230 includes a CMOS switch consisting of a switch transistor Mpsw and a switch transistor Mnsw connected in parallel between the output terminal of the error amplifier 210 and the control terminal of the power transistor Mpout, where a control terminal of the switch transistor Mpsw is used for receiving a first switching control signal $V_{CTRL1}$ and a control terminal of the switch transistor Mnsw is used for receiving a second switching control signal $V_{CTRL2}$. The backflow prevention circuit 220 is configured to compare the input voltage Vin and the output voltage Vout to obtain a comparison result, and generate the first switching control signal $V_{CTRL1}$ and the second switching control signal $V_{CTRL2}$ according to the comparison result, so as to control the switch circuit 230 to operate in an on/off state.

The switch transistor Mpsw may be realized, for example, by a P-type MOSFET, and the switch transistor Mnsw may be realized, for example, by an N-type MOSFET. Based on this, when the output voltage Vout is greater than the input voltage Vin, the first switching control signal $V_{CTRL1}$ is at high voltage level, the second switching control signal $V_{CTRL2}$ is at low voltage level, and the switch transistor Mpsw and the switch transistor Mnsw are turned off to ensure that a current through the control terminal of the power transistor Mpout cannot flow back into the error amplifier 210 when the output voltage Vout is greater than the input voltage Vin.

In an embodiment, the control circuit may further include a clamp circuit 240 connected between the feedback network and the ground. The clamp circuit 240 is used for clamping the feedback voltage VFB below a safe voltage when the output voltage Vout is high, so that the feedback voltage VFB is prevented from being higher than a breakdown voltage inside the circuit, thus effectively protecting other circuits inside the control circuit from being damaged.

Further, the clamp circuit 240 includes transistors Mn1 to Mn3, which are sequentially connected in series between an intermediate node between the resistor R1 and the resistor R2 and ground, and are each connected into a diode structure.

Figure 3:
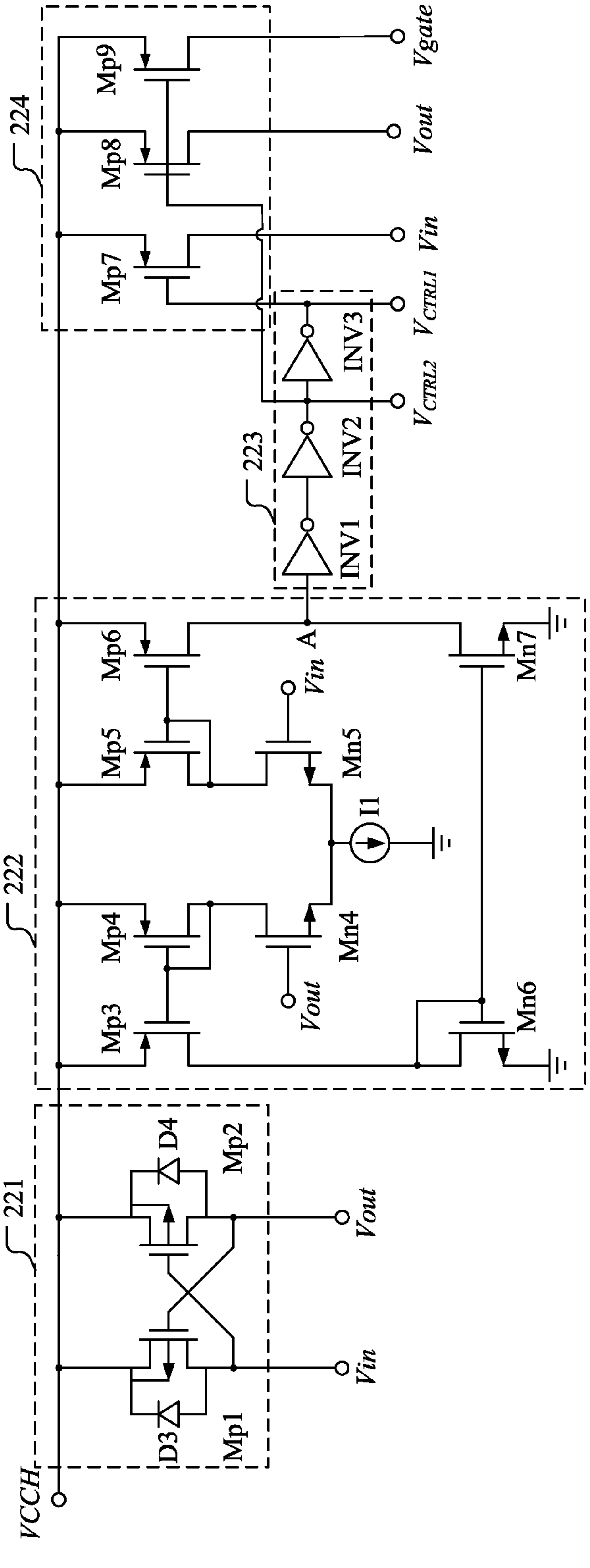
FIG. 3 shows a circuit schematic diagram of the backflow prevention circuit shown in FIG. 2.

FIG. 3 shows a circuit schematic diagram of the backflow prevention circuit shown in FIG. 2. As shown in FIG. 3, the backflow prevention circuit 220 includes a power supply module 221, a comparison module 222, a logic module 223 and an output module 224.

The power supply module 221 is configured to supply power to the comparison module 222 when the voltage difference between the input voltage Vin and the output voltage Vout is less than a turn-on transistor threshold voltage.

The power supply module 221 may include a transistor Mp1 and a transistor Mp2, first current terminals of the transistor Mp1 and the transistor Mp2 are connected to the substrate voltage VCCH, a second current terminal of the transistor Mp1 is used for receiving the input voltage Vin, the second current terminal of the transistor Mp2 is used for receiving the output voltage Vout, a control terminal of the transistor Mp1 is connected to the second current terminal of the transistor Mp2, and a control terminal of the transistor Mp2 is connected to the second current terminal of the transistor Mp1.

When the voltage difference between the output voltage Vout and the input voltage Vin is lower than a turn-on transistor threshold voltage, the transistor Mp1 and the transistor Mp2 are turned off, and the initial substrate voltage VCCH is:

$$VCCH = \mathrm{Max}(Vin, Vout) - VD$$

where, Max(Vin, Vout) denotes a higher one of the input voltage and the output voltage, and VD denotes a voltage for turning on a parasitic diode D3 of the transistor Mp1 and a parasitic diode D4 of the transistor Mp2.

When the voltage difference between the output voltage Vout and the input voltage Vin is greater than the turn-on transistor threshold voltage, there may be two situations at this time: when the input voltage Vin is greater than the output voltage Vout, the transistor Mp1 is turned on, the transistor Mp2 is turned off, and the initial substrate voltage VCCH is equal to the input voltage Vin; when the output voltage Vout is greater than the input voltage Vin, the transistor Mp1 is turned off, the transistor Mp2 is turned on, and the initial substrate voltage VCCH is equal to the output voltage Vout. Further, the power supply module 221 is also configured to supply the initial substrate voltage VCCH to the comparison module 222, so as to supply power to the comparison module 222.

The comparison module 222 is configured to compare the input voltage Vin with the output voltage Vout to generate a comparison signal VA. The logic module 223 is configured to generate the first switching control signal $V_{CTRL1}$ and the second switching control signal $V_{CTRL2}$ according to the comparison signal VA. The output module 224 is configured to switch the substrate voltage VCCH of the power transistor Mpout to the input voltage Vin or the output voltage Vout according to the first switching control signal $V_{CTRL1}$ and the second switching control signal $V_{CTRL2}$, and switching the voltage at the control terminal of the power transistor Mpout to the output voltage Vout according to the second switching control signal $V_{CTRL2}$.

Further, the comparison module 222 includes transistors Mp3 to Mp6, transistors Mn4 to Mn7 and a current source I1. The transistor Mp3 and the transistor Mn6 are sequentially connected in series between the substrate voltage VCCH and ground, the transistor Mp4, the transistor Mn4 and the current source I1 are sequentially connected in series between the substrate voltage VCCH and ground, the transistor Mp5 and the transistor Mn5 are sequentially connected in series between the substrate voltage VCCH and a first terminal of the current source I1, and the transistor Mp6 and the transistor Mn7 are sequentially connected in series between the substrate voltage VCCH and ground. The transistors Mp3 and Mp4 form a current mirror, the transistors Mp5 and Mp6 form a current mirror, and the transistors Mn6 and Mn7 form a current mirror. A control terminal of the transistor Mn4 is used to receive the output voltage Vout, a control terminal of the transistor Mn5 is used to receive the input voltage Vin, and a node A between the transistor Mp6 and the transistor Mn7 is used to provide the comparison signal VA. Wherein, the substrate voltage VCCH is an operating voltage of the comparison module 222, and substrates of the transistors Mn4 and Mn5 are grounded, so that the turn-on threshold voltages of the transistors Mn4 and Mn5 can be high enough to ensure that the comparison module can still operate normally when the substrate voltage VCCH=Max (Vin, Vout)−VD.

The logic module 223 includes inverters INV1 to INV3 sequentially connected in series, an input terminal of the inverter INV1 is connected to the node A to receive the comparison signal VA, an output terminal of the inverter INV2 is used to provide the second switching control signal $V_{CTRL2}$, and an output terminal of the inverter INV3 is used to provide the first switching control signal $V_{CTRL1}$.

The output module 224 includes transistors Mp7 to Mp9. First current terminals of the transistors Mp7 to Mp9 are all connected to the substrate voltage VCCH, a control terminal of the transistor Mp7 is used to receive the first switching control signal $V_{CTRL1}$, a second current terminal is used to receive the input voltage Vin, control terminals of the transistor Mp8 and the transistor Mp9 are used to receive the second switching control signal $V_{CTRL2}$, a second current terminal of the transistor Mp8 is used to receive the output voltage Vout, and a second current terminal of the transistor Mp9 is connected to the control terminal of the power transistor Mpout to provide the voltage Vgate at the control terminal of the power transistor Mpout.

When the input voltage Vin is greater than the output voltage Vout, the voltage at the node A is pulled high through the transistor Mph, so that the comparison signal VA is at high voltage level, the first switching control signal $V_{CTRL1}$ is at low voltage level, and the second switching control signal $V_{CTRL2}$ is at high voltage level, thus the transistor Mp7 is turned on, the transistor Mp8 and the transistor Mp9 is turned off, and the substrate voltage VCCH is equal to the input voltage Vin. When the input voltage Vin is lower than the output voltage Vout, the voltage at node A is pulled low through the transistor Mn7, so that the comparison signal VA is at low voltage level, the first switching control signal $V_{CTRL1}$ is at high voltage level, the second switching control signal $V_{CTRL2}$ is at low voltage level, thus the transistor Mp7 is turned off, the transistor Mp8 and the transistor Mp9 are turned on, the substrate voltage VCCH is equal to the output voltage Vout, and the voltage Vgate at the control terminal is equal to the output voltage Vout.

Further, in the above-described embodiments, the transistors Mp1 to Mp9 can be realized by, for example, P-type MOSFETs, and the transistors Mn1 to Mn7 can be realized by, for example, N-type MOSFETs.

To sum up, in the low dropout linear regulator and the control circuit thereof according to embodiments of the present disclosure, the control circuit comprises a backflow prevention circuit, which is used to compare the input voltage with the output voltage, so as to switch the substrate voltage and the voltage at the control terminal of the power transistor to a higher one of the input voltage and the output voltage, therefore, the power transistor and its parasitic diode can be turned off in time when the output voltage is greater than the input voltage, thus preventing the power transistor from being damaged by current backflow and improving the reliability of the low dropout linear regulator.

In some embodiment, the control circuit further includes a switch circuit connected between the output terminal of the error amplifier and the control terminal of the power transistor, the backflow prevention circuit is configured to turn off the signal path from the output terminal of the error amplifier to the control terminal of the power transistor through the switch circuit when the output voltage is greater than the input voltage, therefore, when the output voltage is greater than the input voltage, a current backflow path from the control terminal of the power transistor to the error amplifier is avoided to be formed, thus preventing the error amplifier from being damaged.

In some embodiments, the control circuit further includes a clamp circuit connected between the feedback network and ground, the clamp circuit is used for clamping the feedback voltage below a safe voltage when the output voltage is high, so that the feedback voltage is prevented from being higher than the breakdown voltage inside the circuit, thus effectively protecting other circuits inside the control circuit from being damaged, and further improving the reliability of the low dropout linear regulator.

It should be noted that although the device is described herein as some kind of N-channel or P-channel device, or some kind of N-type or P-type doped region, one of ordinary skill in the art will appreciate that complementary devices are also possible according to the present disclosure. Those of ordinary skill in the art can understand that the conductivity type is a mechanism that directs the generation of electricity, e.g., conduction through holes or electrons, and therefore the conductivity type relates not to the doping concentration but to the doping type, e.g., P-type or N-type. Those of ordinary skill in the art can understand that the terms “during,” “when,” and “at the time . . . ” in connection with circuit operations are not strict terms for an action that occurs immediately at the beginning of the start-up action, but there may be some small but reasonable one or more delays between it and the reaction initiated by the start-up action, such as various transmission delays. As use herein, the terms “approximately” or “substantially” mean that the element has a parameter that is expected to be close to a declared value or position. However, as is well known in the art, there may always be minor deviations that make it difficult for the value or position to be strictly the same as the declared value. It has been properly determined in the art that, a deviation of at least ten percent (10%) (at least twenty percent (20%) for semiconductor doping concentration) is a reasonable deviation from a described accurate ideal target. When used in conjunction with a signal state, an actual voltage value or logic state of a signal (e.g., “1” or “0”) depends on whether positive logic or negative logic is used.

It should be noted that relational terms, such as “first”, “second”, etc., are used herein only to distinguish one entity or operation from another and do not necessarily require or imply any such actual relationship or order between these entities or operations. Moreover, terms “including”, “comprising” or any other variation thereof are intended to encompass non-exclusive inclusion, so that a process, method, article or equipment including a set of elements, may not only include those elements, but may also include other elements that are not explicitly listed, or may further include elements inherent to such process, method, article or equipment. In the absence of more limitations, an element limited by a statement “comprises a . . . ” does not preclude an existence of another identical element in the process, method, article or equipment including said element.

The embodiments in accordance with the present disclosure are described above, and these embodiments neither exhaustively describe all the details nor limit the present disclosure to only specific embodiments. Obviously, many modifications and variations are possible in light of the above description. The present specification selects and specifically describes these embodiments to better explain the principle and practical use of the present disclosure, so that those skilled in the art may make good use of the present disclosure and modifications based on the present disclosure. The protection scope of the present invention should be based on the scope defined in the claims of the present disclosure.

What is claimed is:

1. A control circuit of a low dropout linear regulator, wherein the low dropout linear regulator comprises a power transistor connected between a power supply terminal and an output terminal, the control circuit is used to drive the power transistor to convert an input voltage into an output voltage, and the control circuit comprises:
an error amplifier, configured to drive the power transistor according to a voltage difference between a feedback voltage of the output voltage and a reference voltage; and
a backflow prevention circuit, configured to compare the input voltage and the output voltage to obtain a comparison result, and switch a substrate voltage and a voltage at a control terminal of the power transistor to a higher one of the input voltage and the output voltage according to the comparison result,
wherein the backflow prevention circuit is further configured to turn off a signal path from an output terminal of the error amplifier to the control terminal of the power transistor when the output voltage is greater than the input voltage.

2. The control circuit according to claim 1, further comprising a switch circuit connected between the output terminal of the error amplifier and the control terminal of the power transistor,
wherein the backflow prevention circuit is further configured to control the switch circuit to operate in an on/off state according to the comparison result between the input voltage and the output voltage.

3. The control circuit according to claim 2, wherein the switch circuit comprises a first switch transistor and a second switch transistor connected in parallel between the output terminal of the error amplifier and the control terminal of the power transistor,
wherein, a control terminal of the first switch transistor is used for receiving a first switching control signal, and a control terminal of the second switch transistor is used for receiving a second switching control signal.

4. The control circuit according to claim 3, wherein the first switch transistor is a P-type MOSFET and the second switch transistor is an N-type MOSFET.

5. The control circuit according to claim 4, wherein the backflow prevention circuit comprises:
a comparison module, configured to compare the input voltage and the output voltage to obtain a comparison signal;
a logic module, configured to generate the first switching control signal and the second switching control signal according to the comparison signal; and
an output module, configured to switch the substrate voltage of the power transistor to the input voltage or the output voltage according to the first switching control signal and the second switching control signal, and switch the voltage at the control terminal of the power transistor to the output voltage according to the second switching control signal.

6. The control circuit according to claim 5, wherein the backflow prevention circuit further comprises a power supply module, configured to supply power to the comparison module when a voltage difference between the output voltage and the input voltage is lower than a turn-on transistor threshold voltage.

7. The control circuit according to claim 6, wherein the power supply module comprises:
a first transistor, having a first current terminal connected to the substrate voltage, a second current terminal for receiving the input voltage, and a control terminal;
a second transistor, having a first current terminal connected to the substrate voltage, a second current terminal for receiving the output voltage, and a control terminal,
wherein the control terminal of the first transistor is connected with the second current terminal of the second transistor, and the control terminal of the second transistor is connected with the second current terminal of the first transistor.

8. The control circuit according to claim 6, wherein the comparison module comprises:
a third transistor and a ninth transistor sequentially connected in series between the substrate voltage and ground;
a fourth transistor, a seventh transistor and a current source sequentially connected in series between the substrate voltage and ground;
a fifth transistor and an eighth transistor sequentially connected in series between the substrate voltage and a first terminal of the current source;
a sixth transistor and a tenth transistor sequentially connected in series between the substrate voltage and ground,
wherein the third transistor and the fourth transistor form a current mirror, the fifth transistor and the sixth transistor form a current mirror, the ninth transistor and the tenth transistor form a current mirror,
a control terminal of the seventh transistor is used for receiving the output voltage, a control terminal of the eighth transistor is used for receiving the input voltage,
an intermediate node between the sixth transistor and the tenth transistor is used to provide the comparison signal.

9. The control circuit according to claim 6, wherein the logic module comprises a first inverter, a second inverter and a third inverter sequentially connected in series,
wherein the input terminal of the first inverter is used for receiving the comparison signal, an output terminal of the second inverter is used for providing the second switching control signal, and an output terminal of the third inverter is used for providing the first switching control signal.

10. The control circuit according to claim 6, wherein the output module comprises:
a third transistor, having a first current terminal connected to the substrate voltage, a second current terminal for receiving the input voltage, and a control terminal for receiving the first switching control signal;
a fourth transistor, having a first current terminal connected to the substrate voltage, a second current terminal for receiving the output voltage, and a control terminal for receiving the second switching control signal; and
a fifth transistor, having a first current terminal connected to the substrate voltage, a second current terminal connected to the control terminal of the power transistor, and a control terminal for receiving the second switching control signal.

11. The control circuit according to claim 1, further comprising a first resistor and a second resistor connected in series between the output terminal and ground, wherein an intermediate node between the first resistor and the second resistor is used for providing the feedback voltage.

12. The control circuit according to claim 11, further comprising a clamp circuit, which is connected between the intermediate node between the first resistor and the second resistor and ground, and is configured to clamp the feedback voltage at a safe voltage.

13. The control circuit according to claim 12, wherein the clamp circuit comprises a first transistor, a second transistor and a third transistor, which are sequentially connected in series between the intermediate node between the first resistor and the second resistor and ground, wherein, the first transistor, the second transistor and the third transistor are each connected into a diode structure.

14. The control circuit according to claim 7, wherein the first transistor and the second transistor are P-type MOSFETs.

15. The control circuit according to claim 8, wherein the third transistor, the fourth transistor, the fifth transistor and the sixth transistor are P-type MOSFETs, the seventh transistor, the eighth transistor, the ninth transistor and the tenth transistor are N-type MOSFETs.

16. The control circuit according to claim 10, wherein the third transistor, the fourth transistor, and the fifth transistor are P-type MOSFETs.

17. The control circuit according to claim 13, wherein the first transistor, the second transistor and the third transistor are N-type MOSFETs.

18. A low dropout linear voltage regulator, comprising:

the control circuit according to claim 1, configured to drive the power transistor;

the power transistor, connected in series between the power supply terminal and the output terminal.

* * * * *